United States Patent [19]
Back et al.

[11] 3,933,785

[45] Jan. 20, 1976

[54] AZO COMPOUNDS

[75] Inventors: Gerhard Back, Lorrach, Germany; Alfred Fasciati, Bottmingen, Switzerland

[73] Assignee: Ciba-Geigy AG, Basel, Switzerland

[22] Filed: Oct. 29, 1973

[21] Appl. No.: 410,748

Related U.S. Application Data

[63] Continuation-in-part of Ser. No. 377,841, July 9, 1973, abandoned, which is a continuation of Ser. No. 63,034, Aug. 11, 1970, abandoned.

[30] Foreign Application Priority Data

Aug. 14, 1969 Switzerland.................... 12432/69

[52] U.S. Cl......... 260/145 B; 260/146 R; 260/147; 260/151; 260/153; 260/155; 260/163; 260/200; 260/240 G; 260/288 R
[51] Int. Cl.$^2$.................. C09B 45/18; C09B 45/48; D06P 1/10; D06P 3/02
[58] Field of Search........ 260/145 A, 145 B, 146 R, 260/147, 150, 151

[56] References Cited
UNITED STATES PATENTS

| | | |
|---|---|---|
| 2,776,956 | 1/1957 | Zickendraht et al. ......... 260/145 A |
| 2,824,094 | 2/1958 | Alkermann et al. ............ 260/146 R |
| 2,839,520 | 6/1958 | Neier ............................ 260/145 A |
| 2,855,392 | 10/1958 | Buehler et al.................. 260/145 B |
| 2,855,393 | 10/1958 | Schetty et al. ................. 260/145 A |
| 2,985,646 | 5/1961 | Schetty et al. ................. 260/145 A |
| 3,073,813 | 1/1963 | Gross et al. .................... 260/146 R |
| 3,125,561 | 3/1964 | Beffa et al. ..................... 260/145 A |
| 3,377,337 | 4/1968 | Sugiyama et al................ 260/155 |
| 3,391,132 | 7/1968 | Beffa et al. ..................... 260/145 A |

*Primary Examiner*—Floyd D. Higel
*Attorney, Agent, or Firm*—Joseph G. Kolodny; Edward McC. Roberts; Prabodh I. Almaula

[57] ABSTRACT

A mixed metal complex compound that contains for every atom of a trivalent metal one molecule of an azo or azomethine compound which contains a complex-forming group in the ortho, ortho'-positions to the azo or azomethine bridge, and one molecule of an azo or azomethine compound acting as trifunctional ligand which contains a complex-forming group in the ortho-position to the azo or azomethine bridge and contains two non-ionisable co-ordination positions. These mixed metal complexes dye nitrogenous fibers such as wool in level shades which are stable to acids and alkalis and have good fastness to light, rubbing, perspiration and water.

17 Claims, No Drawings

AZO COMPOUNDS

CROSS-REFERENCES TO RELATED APPLICATIONS

This is a continuation-in-part application of our co-pending application Ser. No. 377,841 filed July 9, 1973, and now abandoned, which in turn is a continuation of our application Ser. No. 63,034, filed Aug. 11, 1970, and now abandoned.

The present invention provides mixed metal complex compounds which contain for every atom of a trivalent metal one molecule of an azo or azomethine compound which contains a complex-forming group in the ortho, ortho'-positions to the azo or azomethine bridge, and one molecule of an azo or azomethine compound which acts as trifunctional ligand and contains a complex-forming group in ortho-position to the azo or azomethine bridge and which contains two non-ionisable co-ordination positions.

Suitable trivalent complex-forming metals are iron, cobalt and especially chromium.

The said azo or azomethine compounds which contain complex-forming groups in ortho, ortho'-position to the azo or azomethine bridge may be known compounds, for example ortho,ortho'-dihydroxyazobenzene, ortho-hydroxy-ortho'-amino-benzeneazonaphthalene-(1) and others, for example those mentioned below. In this context complex-forming groups are ionisable groups, for example the hydroxyl, carboxyl and amino groups, or groups convertible into ionisable groups, for example alkoxy groups.

Azo or azomethine compounds capable of reacting as trifunctional ligands which contain a complex-forming group in ortho-position to the azo or azomethine bridge and contain two non-ionisable co-ordination positions are azo or azomethine compounds that contain a hetero atom separated from the azo or azomethine bridge by two carbon atoms, whereby said hetero atom is able to activate a co-ordinative bond to the central atom of the complex owing to the presence of a free electron pair. The most important compounds of this kind that may be mentioned are azo and azomethine compounds that contain in the diazo component a heterocyclically bound tertiary nitrogen atom separated from the azo or azomethine bridge by two carbon atoms, for example 5-aminoacridine and especially 8-aminoquinoline. Further suitable azo or azomethine compounds are those which contain a carbonyloxygen atom separated from the azo or azomethine bridge by two carbon atoms. Such azo compounds are those in which the diazo component is a 4-amino-pyrazolone-(5), for example 4-amino-antipyrine.

Further suitable trifunctional ligands are azomethineazo or disazomethine and especially disazo compounds, for example a disazo compound in which the middle component is an 8-aminoquinoline.

In contrast to known mixed metal complex azo compounds, for example of the constitution.

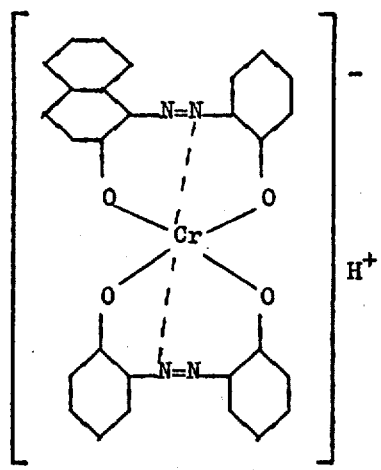

in which, owing to the incomplete compensation charge between the central atom and the four ion bonds and the two co-ordinative bonds, the complex molecule carries a charge which in this case is negative (anionic complex), the central atom in the compounds according to this invention, for example of the constitution

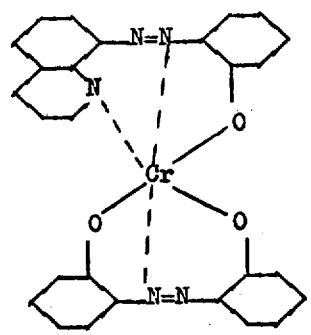

is saturated by three ion bonds and three co-ordinative bonds electrochemically and co-ordinatively so that no positive or negative charge stemming from the complex formation exists.

The neutral mixed complexes described above containing an uncharged central atom can, of course, be made anionic by introduction of suitable acidic groups, for example a sulphonic acid or carboxyl group, or cationic by means of basic groups, for example a quaternated amino group, but this does not change the electro-neutral state of the central atom.

The azo or azomethine compounds containing a hetero atom separated from the azo or azomethine group by two carbon atoms which can act as a non-ionisable co-ordination position, form with the metal atom the stable arrangement of a 5-membered and a 6-membered ring.

The compounds according to this invention may be manufactured by reacting in a molecular ratio of 1 : 1 a 1:1-metal complex compound of an azo or azomethine compound which contains a complex-forming group in ortho, ortho'-positions to the azo or azomethine bridge, with an azo or azomethine compound acting as trifunctional ligand which contains a complex-forming group in ortho-position to the azo or azomethine bridge and contains two non-ionisable co-ordination positions.

The reaction may be carried out in the usual manner, depending on the solubility of the components in various solvents, for example water, ethanole, formamide, a glycol ether, pyridine or the like, if desired at an elevated temperature, and gives uniform mixed complexes in good yield.

Alternatively, the mixed metal complex compounds according to this invention may be prepared by reacting a 1:1-metal complex of an azo or azomethine compound acting as a trifunctional ligand which contains a complex-forming group in ortho-position to the azo or azomethine bridge and contains two non-ionisable co-ordination positions, with a metal-free azo or azomethine compound which contains a complex-forming group in ortho,ortho'-positions to the azo or azomethine bridge. This alternative also proceeds smoothly as a rule and provides uniform products. The last-mentioned process is especially recommended when the compound acting as trifunctional ligand contains acetoacetic acid anilide or barbituric acid as coupling component. The method described is also preferred when ortho-carboxy-ortho'-hydroxyazo or -azomethine compounds are used as azo or azomethine compounds containing complex-forming groups in ortho,ortho'-positions to the azo or azomethine bridge or when corresponding compounds containing or-thoaminonaphthaline components are used. In the last-mentioned cases the process referred to above is difficult and gives but poor yields. Instead of reacting a 1:1-metal complex compound as described above with a suitable second component in a molecular ratio of 1 : 1, the unmetallised azo or azomethine compounds used as starting materials may be reacted in a solvent mixture in a molecular ratio of 1 : 1 within a metal donor (the so-called mixed metallisation). The cobalt mixed complex compounds according to this invention are as a rule accessible only by this method.

The azo compounds containing complex-forming groups in ortho,ortho'-position to the azo bridge used as starting materials correspond to the formula

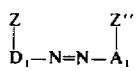

wherein Z and Z'' are each independently hydroxy, carboxy, amino or methoxy and $D_1$ is the residue of a diazo component of the benzene or naphthalene series and $A_1$ is the residue of a coupling component, preferably belonging to the phenol, naphthol, acylacetic acid amide, dihydroxyquinoline, barbituric acid, 5-pyrazolone or naphthylamine series. The said azo dyestuffs may be further substituted, for example by chlorine or bromine atoms, hydroxy, nitro, cyano, lower alkyl (preferably methyl), lower alkoxy (preferably methoxy), loer alkyl-sulphonyl (for example methylsulphonyl or ethylsulphonyl), sulphonic acid, carboxylic acid, sulphonamide and substituted sulphonamide, for example N-lower alkyl-sulphonamide and N-lower hydroxyalkyl-sulphonamide, for example N-methylsulphonamide, N,N-diethylsulphonamide, N-(β-hydroxyethyl)-sulphonamide and N,N-di-(β-hydroxyethyl)-sulphonamide, substituted or unsubstituted phenylazo or naphthylazo and non-reactive acylamino for example formylamino, acetylamino, benzoylamino, benzene-sulphonamide, para-toluenesulphonylamino, methanesulphonylamino, carbomethoxyamino, carboethoxyamino, dimethylamino-sulphonylamino or carboisopropoxyamino groups.

Useful amines of the formula

are those wherein D is phenyl or naphthyl optionally substituted by chloro; bromo; lower alkyl; aryl; lower alkoxy; aryloxy; nitro; sulfo; sulfonamido and substituted sulfonamido; lower alkylsulfonyl; hydroxy-, chloro-, cyano-, or alkoxy-alkylsulfonyl; arylsulfonyl, arylazo; lower alkanoyl, benzoyl and acylamino.

In this specification, the term "lower" designates radicals containing from 1 to 5 carbon atoms. "Aryl" designates naphthyl and especially phenyl, optionally substituted by chloro, bromo, nitro, sulfo, carboxy, lower alkyl and lower alkoxy and substituted sulfonamido means sulfonamido substituted by lower alkyl, lower hydroxyalkyl, lower alkoxyalkyl, lower cyanoalkyl, aralkyl, $C_5$–$C_9$-cycloalkyl or aryl. The term "acylamino" stands for amino substituted by lower alkanoyl, lower alkoxycarbonyl, lower alkylsulfonyl, aroyl, arylsulfonyl or fibre-reactive acyl radicals, such as chloro-, bromo- or sulfatosubstituted lower alkanoyl or alkylsulfonyl, lower alkenoyl optionally substituted by chloro or bromo, chloro- or bromo-substituted triazinyl and pyrimidyl, 2,6-dichloro-pyrimidine-5-carbonyl, 2,3-dichlorochinoxaline-7-carbonyl-, 1,4-dichlorophthalazine-7-carbonyl. Examples of suitable acylamino groups are: acetylamino, propionylamino, ethoxycarbonyl-amino, methylsulfonylamino, benzoylamino, chloro-, nitro- or methylbenzoylamino, phthaloylamino, phenylsulfonylamino, chloro-, nitro- or methylphenylsulfonylamino, chloroacetylamino, α,β-dibromopropionylamino, β-sulfatoethylsulfonylamino, acryloylamino, α-bromoacryloylamino, 2,4-dichlorotriazinylamino, 2-chloro-4-methoxytriazinylamino, 2-chloro-4-isopropoxytriazinylamino, 2,4,5-trichloropyrimidylamino etc.

As examples of primary amines suitable for use as diazo components in the manufacture of such azo dyestuffs the following may be mentioned: 2-Aminophenol, 4- or 5-nitro-2-aminophenol, 4- or 5-chloro-2-aminophenol, 4,5-dichloro-2-aminophenol, 4-chloro-5-nitro-2-aminophenol, 2-aminophenol-4- or -5-sulphonic acid, tri-chloroaminophenol, 4-chloro-2-aminophenol-6-sulphonic acid, 6-chloro-2-aminophenol-4-sulphonic acid, 4-nitro-2-aminophenol-6-sulphonic acid, 6-nitro-2-aminophenol-4-sulphonic acid, 2-aminophenol-4,6-disulphonic acid, 4,6-dinitro-2-aminophenol, 6-acetylamino-2-aminophenol-4-sulphonic acid, 4-acetylamino-2-aminophenol-6-sulphonic acid, 4-methyl-2-aminophenol, 4-methoxy-2-aminophenol, 2-aminophenol-4-sulphonamide, 2-amino-phenol-4-sulphone-N-β-hydroxyethylamide, 2-aminophenol-4-sulphone-N-methylamide, 2-aminophenol-5-sulphonamide, 4-chloro-2-aminophenol-5- or -6-sulphonamide, 2-aminophenol-4-sulphone-N,N-dimethylamide, 2-aminophenol-4-methylsulphone, 2-aminophenol-4-ethylsulphone, 6-acetylamino-4-nitro-2-aminophenol, 2-aminophenol-4,β-hydroxyethylsulphone, anthranilic acid, 2-amino-3-naphthoic acid, 4- or 5-chloroanthranilic acid, 4- or 5-nitroanthranilic acid, 4- or 5-acetylaminoanthranilic acid, 4- or 5-sulphoanthranilic acid, anthranilic acid-4-sulphonamide, anthranilic acid-4- or 5-hydroxyethylsulphone, anthranilic acid-4- or 5-ethylsulphone, 4-chloro-2-aminophenol-5-sulphonic acid-N-methylamide, 4- or 5-benzoylaminoanthranilic acid, 2-anisidine, 4- or 5-chloro-2-anisidine, 4- or 5-nitro-2-anisidine, 2-anisidine-4- or -5-sulphonic acid, 2-methoxy-5-methylaniline, 2,5-dimethoxyaniline, 2-anisidine-4- or 5-β-hydroxyethylsulphone, 2-amino-1-naphthol-4,8-disulphonic acid, 1-amino-2-naphthol-4-sulphonic acid, 1-amino-2-naphthol-4-sulphonamide, 6-nitro--amino-2-naphthol-4-sulphonic acid, 6-acetylamino-1-amino-2-naphthol-4-sulphonic acid, 4-(2',5'-disulphophenylazo)-2-methoxy-5-methylaniline, 4-(2',5'-di-sulphophenylazo)-2,5-dimethoxyaniline, 4-(2',5'-disulphophenylazo)-2-methoxy-1-naphthylamino-6-sulphonic acid, 4-(1',5'-disulphonaphth-2'-ylazo)-2,5-dimethoxyaniline, 4-(2'-, 3'- or 4'-sulphophenylazo)-2-methoxyaniline, dianisidine, benzidine-3.3'-dicarboxylic acid, 4-(2'-, 3'- or 4'-sulphophenyl-azo)-2-methoxy-5-methylaniline, 4-(2'-, 3'- or 4'-sulphophenyl-azo)-2,5-dimethoxyaniline, 4-(2',5'- or 3',5'-disulphophenylazo)-2-methoxyaniline, 4-(3',5'-disulphophenylazo)-2-methoxy-5-methylaniline, 4-(3',5'-disulphophenylazo)-2,5-dimethoxy-aniline, 4-(2'-carboxy-4'-or -5'-sulphophenylazo)-2-methoxy-aniline, 4-(2'-carboxy-4'- or -5'-sulphophenylazo)-2,5-di-methoxyaniline, 4-(2'-carboxy-4'- or -5'-sulphophenylazo)-2-methoxy-5-methylaniline, 4-(6',8'-disulphonaph-2'-ylazo)-2-methoxyaniline, 4-(6',8'-disulphonaphth-2'-ylazo)-2-methoxy-aniline, 4-(6',8'-disulphonaphth-2'-ylazo)-2-methoxy-5-methoxy-aniline and 4-(6',8'-disulphonaphth-2'-ylazo)-2,5-dimethoxy-aniline.

Useful coupling components are: phenole and phenole substituted by lower alkyl, acylamino, sulfo, amino, hydroxy, lower alkanoyl, especially acetyl, and arylazo, naphthole and naphthole substituted by sulfo, hydroxy, acylamino, sulfonamido, substituted sulfonamido, amino, phenylamino and phenylamino substituted in the phenyl nucleus by sulfo or amino, naphthylamines, such as 2-aminonaphthaline, 6-bromo-, 6-methoxy- or 6-methyl-2-aminonaphthaline, 2-aminonaphthaline-6-sulfonic acid, 6-hydroxypyridones substituted in position 1 by lower alkyl; lower hydroxy-, amino- or alkoxyalkyl, such as β-hydroxyethyl, β-aminoethyl, γ-isopropoxypropyl or by amino or substituted amino, such as lower dialkylamino and substituted in position 3 by cyano or carbonamido and in position 4 by lower alkyl, primerily methyl, 5-pyrazolones substituted in position 1 by phenyl or naphthyl optionally substituted in their turn by chloro, lower alkyl, lower alkoxy, amino, nitro, sulfonamido, substituted sulfonamido and lower alkylsulfonyl or hydroxy-, chloro-, alkoxy- or cyanoalkylsulfonyl, acetoacetanilide and benzoylacetanilide optionally substituted in the anilide nucleus by lower alkyl, lower alkoxy, sulfo, lower alkylsulfonyl or lower hydroxy-, chloro-, alkoxy or cyanoalkylsulfonyl, sulfonamido, substituted sulfonamido, chloro and amino.

As examples of coupling components the following may be mentioned: Phenols, for example para-cresol, 3,4-dimethyl-phenol, 2,4-dimethylphenol, 2- or 3-acetylamino-4-methylphenol, 4-tert.butylphenol, 2-hydroxy-5,6,7,8-tetrahydronaphthalene, 2-hydroxy-3-sulphonic acid-5,6,7,8-dihydroxyacetophenone, 2-carboethoxyamino-4-methylphenol, resorcinol, meta-aminophenol, 2,4-dihydroxyacetonnphenone, 2,4-dihydroxyazobenzene, 2,4-di-hydroxyazobenzene-2'- or -4'-sulphonic acid, 2,4-dihydroxy-azobenzene-2',5'-disulphonic acid, 2,4-dihydroxy-4'-nitroazobenzene, 2,2',4-trihydroxyazobenzene-3',5'-disulphonic acid, 2,4-dihydroxy-4'- or -5'-(acetylamino)-azobenzene-2'-sulphonic acid and 4-(2',4'-dihydroxyphenylazo)-4'-nitrostilbene-2,2'-disulphonic acid; naphthols, for example 2-naphthol, 1,3- or 1,5-dihydroxynaphthalene, 2-naphthol-6-sulphonic acid, 1,8-dihydroxynaphthalene-3,6-disulphonic acid, 1,3-dihydroxynaphthalene-5-, -6- or -7-sulphonic acid, 1,3-dihydroxynaphthalene-5,7-disulphonic acid, 2-naphthol-6-sulphonamide, 2-naphthol-6-β-hydroxyethylsulphone, 1-amino-7-naphthol, 1-acetylamino-7-naphthol, 1-propionylamino-7-naphthol, 1-carbomethoxyamino-7-naphthol, 1-carboethoxyamino- 7-naphthol, 1-carbopropoxyamino-7-naphthol, 1-dimethylamino-sulphonylamino-7-naphthol, 2-amino-5-naphthol-7-sulphonic acid, 2-amino-5-naphthol-1,7-disulphonic acid, 1-amino-4-napthol, 2-amino-6-naphthol, 2-acetylamino- 5-naphthol-7-sulphonic acid, 2-benzoylamino-5-naphthol-7-sulphonic acid, 2-phenylamino-5-naphthol-7-sulphonic acid, 2-(3'-sulphoanilino)-5-naphthol-7-sulphonic acid, 2-amino-8-naphthol-6-sulphonic acid, 2-amino-6-naphthol-8-sulphonic acid, 2-acetylamino- 8-naphthol-6-sulphonic acid, 2-(3'- or 4'-amino-benzoylamino)-5-naphthol-7-sulphonic acid, 2-(3'- or 4'-amino-benzoylamino)-8-naphthol-6-sulphonic acid, 1-(3'- or 4'-amino-benzoylamino)-8-naphthol-3,6-disulphonic acid, 2-(3'- or 4'-aminoanilino)-5-naphthol-7-sulphonic acid, 2-(3'- or 4'-aminoanilino)-8-naphthol-6-sulphonic acid, 1-(3'- or 4'-aminoanilino)-8 naphthol-3,6-disulphonic acid, 2-(3'-amino- 4'-sulphoanilino)-5-naphthol-7-sulphonic acid, 2-phenylamino-8-naphthol-3,6-disulphonic acid, 2-(4'-amino-3'-sulphoanilino)-5-naphthol-7-sulphonic acid, 2-(4'-amino-3'-sulphoanilino)-8-naphthol-6-sulphonic acid, 1-amino-8-naphthol-3,6-, -2,4- or -4,6-disulphonic acid, 1-amino-8-naphthol-4-sulphonic acid, 1-phenylamino-8-naphthol-4-sulphonic acid, 1-amino-5-naphthol-7-sulphonic acid, 1-acetylamino-8-naphthol-3,6- or -4,6-disulphonic acid, 1-benzoylamino-8-naphthol-3,6- or -4,6-disulphonic acid, 1-phenylamino-8-naphthol-3,6- or -4,6-disulphonic acid, 1-naphthol-4-sulphonic acid, 1-naphthol-4,6-disulphonic acid, 2-naphthol-6,8 -disulphonic acid, 1-naphthol-5-sulphonic acid, 2-naphthol-3,6-disulphonic acid, 2-naphthol-3,6,8-trisulphonic acid, 2-amino-8-naphthol-3,6-disulphonic acid, 6-acetyl-2-naphthol, 4-acetyl-2-naphthol, 4-acetyl-2-naphthol, 4-methoxy-1-napthol, 4-acetyl-1-naphthol, 1-naphthol-3-, -4- or -5 -sulphonamide, 2-naphthol-3-, -4-, -5-, -6-, -7- or -8-sulphonamide, 5,8-dichloro-1-naphthol, 2-methyl-amino-5-naphthol-7-sulphonic acid, 2-methylamino-8-naphthol- 6-sulphonic acid 1-butylamino-8-naphthol-3,6-disulphonic acid, 1-naphthol-3,6,8-trisulphonic acid, 6-β-hydroxyethylsulphonyl-2-naphthol-3-sulphonic acid, 1-naphthol-3,6- or -3,8-disulphonic acid, 2-(4'-nitrophenylazo)-1-amino-8-naphthol-3,6- or -3,8 -disulphonic acid, 2-(4'-nitrophenylazo)-1-amino-8-naphthol-3,6-disulphonic acid, 2-(2'-sulphophenylazo)-1-amino-8-naphthol-3,6-disulphonic acid, 1,4-dichloro-8-naphthol, 1-naphthol-8-sulphonic acid, 2-(2',5'-disulphophenylazo)-1-amino-8-naphthol-3,6-disulphonic acid and 2-naphthol-7- or -8-sulphonic acid; heterocylic coupling components for example barbituric acid, 2,6-dihydroxy-3-cyano-4-methylpyridine and 2,4-dihydroxy-quinoline; 5-pyrazolones for example 3-methyl-5-pyrazolone, 1,3-dimethyl-5-pyrazolone, 5-pyrazolone-3-carboxylic acid and its amides, preferably 1-aryl-5-pyrazolones for example 1-phenyl-3-methyl-5-pyrazolone, 1-(2'-, 3'- or 4'-methylphenyl)-3-methyl-5-pyrazolone, 1-(2'-, 3'- or 4'-sulphophenyl)-3-methyl-5-pyrazolone, 1-[3'- or 4'-

(β-hydroxyethylsulphonyl)-phenyl]-3-methyl-5-pyrazolone, 1-phenyl-3-carboxy-5-pyrazolone, 1-(3'- or 4'-aminophenyl)-3-methyl-5-pyrazolone, 1-(2'-methoxyphenyl)-3-methyl-5-pyrazolone, 1-(2'-, 3'- or 4'-chlorophenyl)-3-methyl-5-pyrazolone, 1-(3'- or 4'-aminophenyl)-3-carboxy-5-pyrazolone, 1-(3'-amino-4'-sulphophenyl)-3-(carboxy- or methyl)-5-pyrazolone, 1-(4'-amino-3'-sulphophenyl)-3-carboxy- or methyl)-5-pyrazolone, 1-(2'-, 3'- or 4'-nitrophenyl)-3-methyl-5-pyrazolone, 1-(2',5'- or 3',4'-dichlorophenyl)-3-methyl-5-pyrazolone, 1-(2'-, 3'- or 4'-sulphamylphenyl)-3-methyl-5-pyrazolone, 1-(2'-, 3'- or 4'-methylsulphonylphenyl)-3-methyl-5-pyrazolone, 1-phenyl-5-pyrazolone-3-carboxylic acid cresidide, 1-phenyl-5-pyrazolone-3-carboxylic acid-2'-toluidide, 1-phenyl-5-pyrazolone-3-carboxyanilide, 1,3-diphenyl-5-pyrazolone, 1-(2'-, 3'- or 4'-N-methylsulphamylphenyl)-3-methyl-5-pyrazolone, 1-(6'chloro-3'-methyl-4'-sulphophenyl)-3-methyl-5-pyrazolone, 1-(2',5'-dichloro-4'-sulphophenyl)-3-methyl-5-pyrazolone, 1-(2'-methyl-5'-sulphophenyl)-3-methyl-5-pyrazolone, 1-(4'-chloro-2'-sulphophenyl)-3-methyl-5-pyrazolone, 1-(6'-chloro-4'sulpho-2'-methylphenyl)-3-carboethoxy-5-pyrazolone, 1-(2',5'-disulphophenyl)-3-methyl-5-pyrazolone, 1-(4'-sulphophenyl)-3-carboxy-5-pyrazolone, 1-(2'-, 3'- or 4'-carboxyphenyl)-3-methyl-5-pyrazolone, 1-(6'-chloro-4'-sulpho-2'-methylphenyl)-3-methyl-5-pyrazolone, and 3-carboxy-5-pyrazolone; acetacetic acid amides, preferably acetoacetic acid anilides and benzoyl-acetic acid anilides, for example acetoacetanilide, acetoacet-4-(β-hydroxyethylsulphonyl)-anilide, acetoacet-ortho-anisidide, acetoacet-ortho-toluidide, acetoacet-ortho-chloroanilide, acetoacetanilide-3- or 4-sulphonic acid, acetoacet-3- or 4-aminoanilide, acetoacet-m-xylidide, acetoacetanilide-2- or 3- or 4-carboxylic acid, benzoylacetanilide, benzoylacetanilide-3- or 4-sulphonic acid, benzoylacet-3- or 4-aminoanilide and acetoacetanilide-4-sulphonamide; naphthylamines, for example 2-naphthylamine, 1-naphthylamine, 1-naphthylamine-4-sulphonic acid, 2-methylaminonaphthalene, 2-aminonaphthalene-6-sulphonamide, 2-amino-8-naphthol-6-sulphonic acid, 2-methylamino-8-naphthol-6-sulphonic acid and 2-phenylamino-8-naphthol-6-sulphonic acid, 2-phenylaminonaphthalene, 2-(3'-chlorophenyl)-aminonaphthalene, 2-aminonaphthalene-6-sulphonic acid and 2-aminonaphthalene-6-sulphonic acid -N-methylamide.

The azo compounds acting as trifunctional ligands, which contain a complex-forming group in ortho-position to the azo bridge and contain two non-ionisable co-ordination postions, may be manufactured in known manner by coupling a diazotised primary amine containing a hetero atom which is separated from the amino group preferably by two carbon atoms, with a coupling component capable of coupling in vicinal position to a hydroxyl or amino group. Suitable diazotisable primary amines are: 8-Aminoquinoline, 5-chloro-8-aminoquinoline, 2-methyl-8-aminoquinoline, 5,7-dibromo-8-aminoquinoline, 8-aminoquinoline-5-sulphonic acid, 5-acetylamino-8-aminoquinoline, 8-amino-5-(4'-sulphophenylazo)-quinoline, 1-phenyl-2,3-dimethyl-4-amino-pyrazolone-(5), 5-aminoacridine, 2aminoacetophenone and 2-aminobenzophenone.

The preferred amines are those of the formula

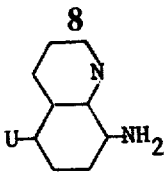

wherein U is hydrogen, sulfo, chloro, bromo, nitro acylamino or arylazo. The term arylazo encompasses phenylazo groups, wherein the phenyl nucleus is optionally substituted by chloro, bromo, nitro, sulfo, carboxy, lower alkyl and lower alkoxy and acylamino.

The coupling component of the formula $A_2$-Z'' capable of coupling in vicinal position to a hydroxyl or amino group may be one of the usual phenols, naphthols, anilines, naphthylamines or ketomethylenes or the like mentioned above in describing the azo compounds containing complex-forming groups in ortho, ortho'-positions.

The azomethine compounds suitable for use as starting materials which contain complex-forming groups in ortho, ortho'-positions to the azomethine group, or the azomethine compounds acting as trifunctional ligands which contain a complex-forming group in ortho-position to the azomethine bridge and contain two non-ionisable co-ordination positions, can be manufactured in known manner by reacting primary amines, for example those mentioned above as diazo components, with appropriate aldehydes of the formula $OCH-A_2-Z''$. Such aldehydes are preferably those of the formula

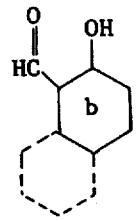

wherein the ring b can be further substituted for halogen, especially chlorine or by nitro or lower alkyl, for example salicylaldehyde or o-hydroxynaphthaldehyde.

When the mixed metal complex compounds according to this invention, or the azo or azomethine compounds used as starting materials, contain acylatable amino groups not in ortho-position to the azo or azomethine bridge, that is to say those which do not participate in the complex formation, these amino groups can be condensed with acylating reagents that contain fibre-reactive substituents.

Fibre-reactive substituents are reactive groupings capable of reacting with the hydroxyl groups of cellulose or with the carbamide groups of polyamides with formation of a covalent bond, for example aliphatic and especially heterocyclic groupings. Examples of fibre-reactive groups are: Acryl, α-halogenoacryl, β-chloro- or β-bromopropionyl, α,β-dichloro- or dibromopropionyl, β-sulphatopropionyl, halogeno-crotonyl, chlorobenzthiazole, dichloroquinoxaline-CO-, dichloroquinazoline-CO groups and the like, and particularly halogenopyrimidyl and methanesulphonylpyrimidyl groups.

Specially valuable are those compounds which contain a triazine grouping as fibre-reactive substituent, especially a grouping of the formula

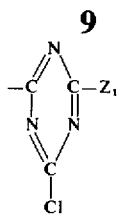

in which $Z_1$ represents a chlorine atom or an alkyl or phenyl group, an $-NH_2$ group or the residue of an alcohol, phenol, mercaptan or amine, for example an aliphatic or aromatic amine.

The acylation may be carried out in known manner, for example in an aqueous medium with addition of an acid acceptor, for example sodium hydroxide or carbonate.

The azo and azomethine compounds according to this invention may also be obtained, especially in the case of the cobalt complexes, by metallising a mixture of the azo or azomethine compound with a metal donor, particularly a cobalt donor, whereupon the reaction takes place practically immediately. When an alkoxy group is present in vicinal position to the azo group, it is converted during the metallisation in the usual manner (intermediately) into a hydroxyl group (the so-called dealkylating metallisation). In the case of the chromium complexes it is advantageous first to manufacture the 1:1-chromium complex of the azo or azomethine compound and then to react it with the trifunctional ligand.

In carrying out the manufacturing process of this invention it is generally advantageous to use the metallising reagent, the azo or azomethine compound and the trifunctional ligand in quantities that correspond approximately to the stoichiometric proportions required for the composition of the final product. Furthermore, it is generally advantageous to carry out the metallisation in a weakly acidic to alkaline medium. Preferred cobalt donors are simple cobalt salts, for example cobalt sulphate, or if desired freshly precipitated cobalt hydroxide. With these simple cobalt salts the treatment according to the invention may also be carried out in a weakly acidic medium.

The conversion of the complex chromium or cobalt compounds is advantageously carried out with heating under atmospheric or superatmospheric pressure, for example at the boiling temperature of the reaction mixture, if required or desired in the presence of suitable additives, for example in the presence of salts of organic acids, bases, organic solvents (for example glycol monomethyl ether, ethanol or n-butanol) or further reagents that favour the complex formation.

The 1:1-complexes used as preferred starting materials in the manufacture of the chromium complexes according to this invention can be manufactured by known methods, for example by reacting the metallisable azo or azomethine compound free from complex-forming metal in an organic medium (for example in a water-miscible medium for example pyridine, glycol monomethyl ether, formamide, dioxane or the like) or in an aqueous acidic medium with an excess of a salt of trivalent chromium, for example chromium acetate, chromium formate, chromium chloride, chromium sulphate or chromium fluoride, at the boil or preferably at a temperature above 110°C. The following reaction of the 1:1-chromium complex with the trifunctional ligand according to this invention may be carried out in an organic medium or preferably in an aqueous, weakly acidic, neutral or alkaline medium, under atmospheric or superatmospheric pressure, at room temperature or with heating, for example at a temperature in the range of from 50° to 120°C. In general it is also advantageous in this case to use for the reaction approximately stoichiometric proportions of the metalliferous 1:1-complex and the trifunctional ligand.

The metalliferous, especially chromiferous and cobaltiferous azo and azomethine compounds accessible by the present process and its variants are new; they are surprisingly stable and are suitable for dyeing or printing a wide variety of materials, especially for dyeing materials of animal origin for example silk, leather and especially wook, and also for dyeing or printing synthetic fibres of polyamides or polyurethanes, polyacrylonitrile fibres and the like.

In the absence of an anionic charge, that is to say when no sulphonic acid groups or the like are present, the solubility in water of the mixed metal complex compounds according to the invention is considerably lowered. Instead, they are much more soluble in organic solvents. In the absence of solvatisible substituents, for example a sulphonamide or nitro group, the solubility in organic solvents is only moderate.

The mixed complexes containing one or more sulphonic acid groups are especially valuable as dyestuffs for wool, silk, leather and especially polyamides. The mixed complexes containing sulphonamide groups are suitable for use as lacquer dyestuffs for spin-dyeing polyamides. When the mixed complexes containing a fibre-reactive group contain two or more sulphonic acid groups, they may be used as reactive dyestuffs in the usual manner. When sulphonic acid groups are completely absent, the dyestuffs are reactive disperse dyestuffs.

Mixed complexes according to this invention which carry a cationic charge are especially suitable for use as dyestuffs for polyacrylonitrile fibres.

The dyeings obtained with the new mixed complexes provide all shades from yellow through brown, olive, grey and green to black, which as a rule are well covered.

The new dyestuffs may be used for dyeing nitrogenous fibres for example wool, for example in an acetic acid or a neutral bath; when only slightly water-soluble dyestuffs are used a suitable dispersing agent is added. When readily water-soluble complexes are used that is to say those which contain in the azo dyestuff two or more sulphonic acid groups, it is advantageous to dye with addition of the assistants conventionally used in dyeing.

Furthermore, nitrogenous fibres, especially wool, can be advantageously dyed with the dyestuffs prepared by the present process by treating the fibres continuously, for example in a padder, with an aqueous preparation which contains a wool dyestuff and an assistant which is capable of forming with water, ± additives a system consisting of two liquid phases with a mixture gap, the ratio between water (or water+additives) and the assistant being within the mixture gap or near it, said mixture gap occurring even with a relatively low content of assistant and within a wide region of the mixture gap the phase containing more assistant making up a substantial share, whereupon the material treated with the aqueous preparation is subjected to a heat treatment.

The dyeings and prints obtained with the new dyestuffs are as a rule distinguished by their levelness, stability towards acids and alkalines, good fastness to light and rubbing and very good fastness to perspiration and water. As a rule they hardly change their appearance in artificial light and some of them have very interesting and valuable shades.

Unless otherwise indicated, parts and percentages in the following Examples are by weight. The relationship between parts by weight and parts by volume is the same as that between the gram and the cubic centimetre.

EXAMPLE 1

3.89 Parts of the azo dyestuff obtained from diazotised 1-hydroxy-2-amino-5-nitrobenzene and 1-hydroxynaphthalene-4-sulphonic acid in the form of the 1:1-chromium complex and 2.48 parts of the azomethine obtained from 8-aminoquinoline and salicylaldehyde together with 2 parts of sodium hydrogencarbonate, in a mixture of 100 parts by volume of water and 50 parts by volume of ethanol are heated to 80° to 85°C with stirring. The resulting dark-green mixed complex settles out (partly) in the form of a crystalline precipitate. As soon as neither of the two starting components can be identified in the reaction mixture, the 1:2-mixed complex of the azo dyestuffs of the formulae

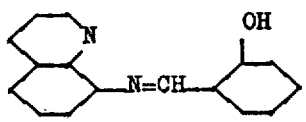

and

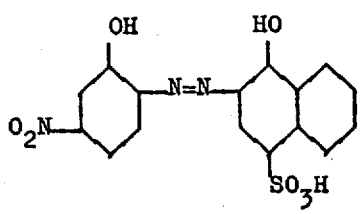

is completely separated by adding sodium chloride, filtered, washed with dilute sodium chloride solution and dried at 70°C under vacuum. After having been ground, the dyestuff forms a dark powder soluble in hot water and dyes wool, polyamide fibres or natural silk from a weakly acidic bath full, bluish dark-green shades having good general fastness properties, especially good fastness to light.

EXAMPLE 2

4,19 Parts of the 1:1-chromium complex azo dyestuff obtained from diazotised 1-hydroxy-2-amino-4-nitrobenzene-6-sulphonic acid and 1-phenyl-3-methylpyrazol-5-one are reacted as described in Example 1 with the azomethine obtained from 8-aminoquinoline and salicylaldehyde.

The resulting uniform mixed complex of the azo dyestuffs of the formula

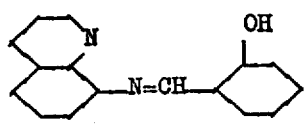

and

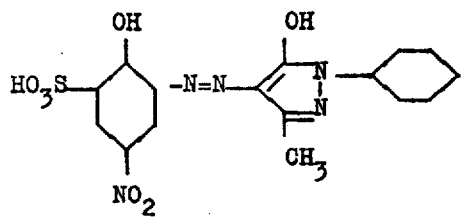

dyes wool and polyamide fibres from a bath containing ammonium sulphate very fast scarlet shades.

EXAMPLE 3

3.79 Parts of the azo dyestuff obtained from diazotised 1-hydroxy-2-amino-4-chlorobenzene and 2-hydroxynaphthalene-6-sulphonic acid in the form of the 1:1-chromium complex and 3.79 parts of the azo dyestuff prepared in known manner from diazotised 8-aminoquinoline and 1-hydroxynaphthalene-4-sulphonic acid are dissolved in 200 parts by volume of water with addition of 2 parts of sodium carbonate. The reaction mixture is then heated to the boil and stirred under reflux until the two parent dyestuffs can no longer be identified. The resulting mixed complex of the azo dyestuffs of the formulae

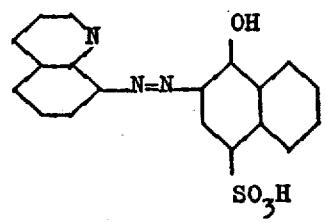

and

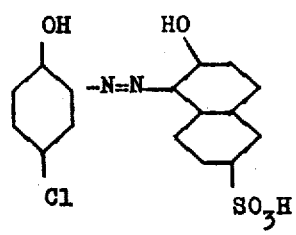

is precipitated from the reaction solution with sodium chloride, filtered, washed with dilute sodium chloride solution and dried under vacuum. After having been ground, the dyestuff forms a dark powder which gives a grey-blue solution in water. It dyes wool or polyamide fibres from a weakly acidic bath full, blue-black shades having very good properties of fastness.

EXAMPLE 4

3.89 of the azo dyestuff obtained from diazotised 1-hydroxy-2-amino-5-nitrobenzene and 1-hydroxynaphthalene-4-sulphonic acid in the form of the 1:1-chromium complex and 3.29 parts of the azo dyestuff obtained from diazotised 8-aminoquinoline and 1-phenyl-3-methylpyrazol-5-one are stirred into 100 parts of formamide, 2 parts of anhydrous sodium acetate are then added and the reaction is stirred at 100 to 105°C until the reaction is complete. The mixed complex of the azo dyestuffs of the formulae

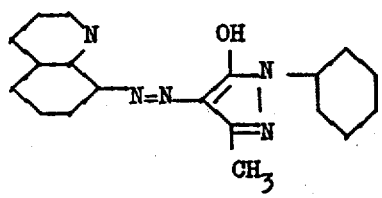

and

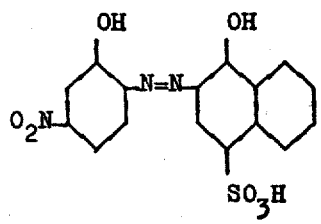

which precipitates on dilution of the reaction mixture with sodium chloride solution is filtered, washed with dilute sodium chloride solution and dried. The new dyestuff is soluble in alcohol, acetone, pyridine and dimethylformamide forming a dark-green solution but only traces of it are water-soluble. By means of a fine, aqueous suspension prepared in the usual manner polyamide fibres can be dyed deep fast olive-grey tints.

EXAMPLE 5

3.43 Parts of the dyestuff obtained from diazotised 1-hydroxy-2-aminobenzene-4-sulphonamide and 2-hydroxynaphthalene in the form of the 1:1-chromium complex, and 3.43 parts of the azo dyestuff obtained from diazotised 2-methyl-8-amino-quinoline and 1-phenyl-3-methylpyrazol-5-one as well as 2 parts of anhydrous sodium acetate are stirred into 100 parts of dimethylformamide. After having stirred the reaction mixture for 3 hours at 120° to 125°C, the parent dyestuffs can no longer be identified. Working up as described in Example 4 provides an olive-brown mixed complex dyestuff which is readily soluble in acetone, ethyl acetate and isopropanol and can be used for colouring nitro lacquers greenish brown tints having very good fastness to light.

EXAMPLE 6

3.88 Parts of the azo dyestuff obtained from diazotised 1-hydroxy-2-amino-5-nitrobenzene and 2-aminonaphthalene-6-sulphonic acid in the form of the 1:1-chromium complex and 4.38 parts of the azo dyestuff prepared in known manner from diazotised 1-phenyl-2,3-dimethyl-4-aminopyrazol-5-one and 2-hydroxynaphthalene-6-sulphonic acid together with 2 parts of sodium hydrogen carbonate in 200 parts by volume of water are heated at the boil until the two parent dyestuffs can no longer be identified in the reaction mixture. The resulting mixed complex of the azo dyestuffs of the formulae

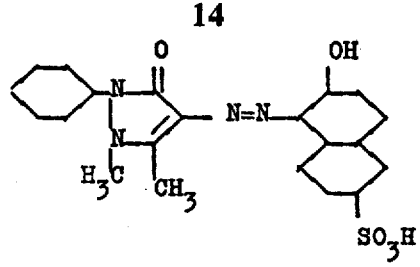

and

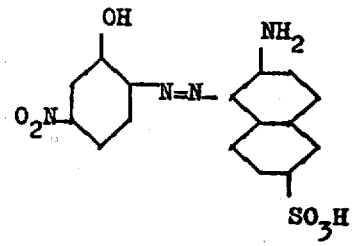

is isolated as indicated in Example 3; it dyes wool or polyamide fibres full, fast corinth shades.

EXAMPLE 7

25.9 Parts of the dyestuff obtained by alkaline coupling of 1-hydroxy-8-aminonaphthalene-3,6-disulphonic acid with diazotised 1-hydroxy-2-amino-4-chloro-5-nitrobenzene in the form of the 1:1-chromium complex are reacted according to Example 6 with 20.5 parts of the azo dyestuff obtained from diazotised 8-aminoquinoline-5-sulphonic acid and 1-phenyl-3-methylpyrazol-5-one to form the uniform mixed complex. The resulting reaction solution is cooled to a temperature between 0° and 3°C and adjusted to a neutral reaction with dilute hydrochloric acid. While cooling in an ice bath a solution of 14 parts of α,β-dibromopropionyl chloride in 50 parts of volume of acetone is then stirred in dropwise, while at the same time adding dilute sodium hydroxide solution to maintain the pH value between 6 and 7. When diazotisable amino groups can no longer be identified in the deep green, clear reaction solution, the mixed complex is precipitated with sodium chloride, filtered, washed with sodium chloride solution and dried at 60°C under vacuum.

The resulting mixed complex of the azo dyestuffs of the formulae

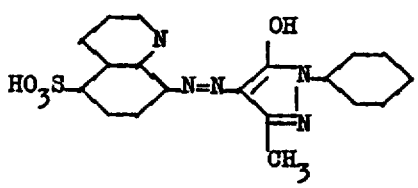

and

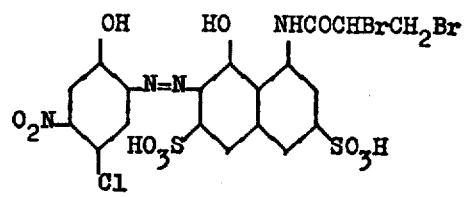

is a readily water-soluble dark green powder and dyes wool from an acetic acid bath in the presence of a condensation product of higher fatty amines with ethylene oxide fast olive shades.

EXAMPLE 8

15 Parts of the azo dyestuff obtained by coupling diazotised 8-aminoquinoline with 2-hydroxynaphthalene and 15 parts of chromium-III-chlorine hexahydrate are introduced into 500 parts by volume of glycol monomethyl ether. The suspension is then raised to the boil while being stirred and stirred under reflux until the dyestuff has been completely converted into the 1:1-chromium complex.

The clear, dark-green solution is mixed at 100 to 105°C with 6 parts of anhydrous sodium acetate and 20.1 parts of the azo dyestuff prepared from diazotised 1-carboxy-2-aminobenzene-4-sulphonic acid and 1-phenyl-3-methylpyrazol-5-one; 100 parts by volume of formamide are then poured into the mixture which is stirred at 100° to 105°C to complete the reaction to provide the mixed complex of the azo dyestuffs of the formulae

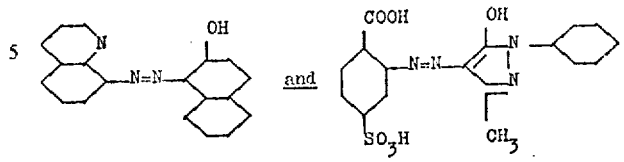

The precipitate formed when the reaction batch is diluted with sodium chloride solution is filtered, washed with dilute sodium chloride solution and dried in the usual manner. The new dyestuff dissolves in hot water to give an olive-brown solution. On wool or polyamide fibres it produces fast yellowish brown dyeings.

When the 1:1-chromium complex compounds of the azo compounds shown in column I of the following table are reacted as described in Examples 1 to 8 with the metal-free azo or azomethine compounds of column II, further chromium mixed complex dyestuffs are obtained which dye wool or polyamide fibres the shades shown in column III.

| Nr | I | II | III |
|----|---|----|-----|
| 1 | 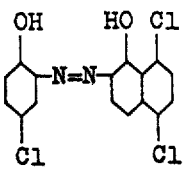 | 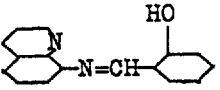 | green |
| 2 | 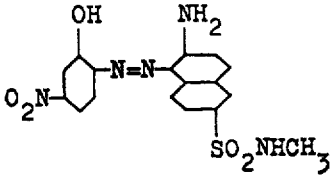 | 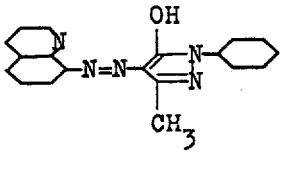 | olive |
| 3 | 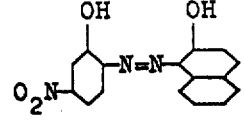 | 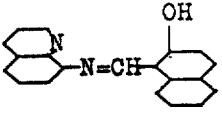 | black |
| 4 | 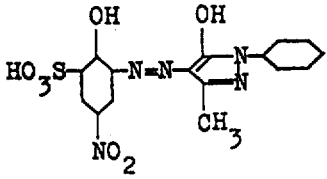 | 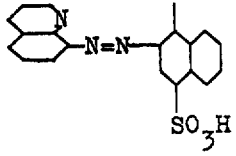 | brown |

-continued

| Nr. | I | II | III |
|---|---|---|---|
| 5 | HO₃S-[naphthalene with OH, SO₃H]-N=N-[naphthalene with OH, HO] | [quinoline]-N=CH-[phenol with OH] | green |
| 6 | [phenol with OH, SO₂NH₂]-N=N-[naphthol with OH] | id. | black |
| 7 | [benzene with OH, O₂S-NH₂, Cl]-N=N-[pyrazole with OH, CH₃, phenyl] | [quinoline]-N=CH-[phenol with OH] | claret |
| 8 | [benzene with OH, O₂N]-N=N-[pyridine with CH₃, CN, HO, OH] | " | red-violet |
| 9 | [benzene with OH, O₂N]-N=N-[naphthalene with OH, SO₃H] | [quinoline]-N=N-[naphthol with OH] | blue-black |
| 10 | " | [quinoline]-N=N-[naphthalene with NH₂] | green-black |

| Nr. | I | II | III |
|---|---|---|---|
| 11 | HO₃S-[naphthyl(OH)]-N=N-[pyrazolone with OH, CH₃, N-phenyl] | [quinolinyl]-N=N-[naphthyl(OH)(SO₃H)] | red-violet |
| 12 | HO₃S-[naphthyl(OH)(NO₂)]-N=N-[naphthyl(OH)] | HO₃S-[quinolinyl]-N=N-[naphthyl(OH)(SO₃H)] | green-black |
| 13 | [phenyl(OH)(SO₂NHCH₃)(Cl)]-N=N-[naphthyl(OH)] | [quinolinyl]-N=N-[naphthyl(OH)] | violet-black |
| 14 | [phenyl(OH)(NO₂)]-N=N-[naphthyl(NH₂)(SO₃H)] | HO₃S-[phenyl]-N=N-[quinolinyl]-N=N-[naphthyl(OH)] | green-grey |
| 15 | HO₃S-[naphthyl(OH)]-N=N-[naphthyl(OH)] | [pyrazolone with CH₃-O, (CH₃)₂N, N-phenyl]-N=N-[naphthyl(OH)(SO₃H)] | violet |
| 16 | [phenyl(OH)(SO₂NH₂)(Cl)]-N=N-[pyrazolone with OH, CH₃, N-phenyl] | [quinolinyl]-N=N-[pyrazolone with OH, CH₃, N-phenyl(SO₂NH₂)] | red |

| Nr. | I | II | III |
|---|---|---|---|
| 17 | (structure: 2-OH, 4-SO2NH2, 5-Cl phenyl –N=N– pyrazolone with OH, CH3, phenyl) | (structure: quinoline –N=N– naphthol with SO2NH2) | brown-violet |
| 18 | (structure: 2-COOH, 5-SO3H phenyl –N=N– pyrazolone with OH, CH3, phenyl) | (structure: HO3S-quinoline –N=N– aminonaphthalene with H2N) | olive-green |
| 19 | " | (structure: quinoline –N=N– pyrazolone with OH, CH3, N-phenyl) | yellow |
| 20 | (structure: 2-COOH, 5-SO3H phenyl –N=N– pyrazolone with OH, CH3, phenyl) | (structure: quinoline –N=N– C(OH)=C(CH3)–C(=O)–NH–phenyl) | yellow |
| 21 | (structure: 2-OH, 5-NO2 phenyl –N=N– naphthol with OH, SO3H) | (structure: HO3S-quinoline –N=N– naphthol with OH) | grey |
| 22 | (structure: HO3S, OH, NO2 phenyl –N=N– pyrazolone with OH, CH3, phenyl) | (structure: pyrazolone (H3C-C, H3C-N, N-phenyl, C=O) –N=N– naphthol with OH, SO3H) | scarlet |

| Nr. | I | II | III |
|---|---|---|---|
| 23 | 2-hydroxy-5-nitrophenyl azo coupled to hydroxy-naphthalene sulfonic acid | pyridyl-azo-(hydroxy-methyl-pyrazole-phenyl)-SO₂NH₂ | olivegrey |
| 24 | hydroxy-sulfo-nitrophenyl azo hydroxy-methyl-phenyl-pyrazole | quinolinyl-azo-hydroxy-naphthalene-SO₂NH₂ | brown-red |
| 25 | hydroxy-nitrophenyl azo amino-naphthalene sulfonic acid | quinolinyl-azo-amino-naphthalene-SO₂NHCH₃ | grey |
| 26 | sulfo-hydroxy-nitro-naphthalene azo hydroxy-naphthalene | dimethyl-phenyl-pyrazolone azo hydroxy-methyl-phenyl-pyrazole | olive |
| 27 | sulfo-hydroxy-naphthalene azo hydroxy-naphthalene | sulfo-quinolinyl-N=CH-hydroxyphenyl | dark-green |
| 28 | hydroxy-nitrophenyl azo hydroxy-naphthalene | quinolinyl-N=CH-hydroxy-naphthalene | green-black |

| Nr. | I | II | III |
|---|---|---|---|
| 29. | [structure: HO₃S-naphthalene-OH with N=N to naphthalene-OH] | [structure: CH₃-C=C-N=N-benzene with NH₂ and SO₂NHCH₃; pyrazolone with CH₃-N, C=O, phenyl] | grey |
| 30. | [structure: O₂N-benzene-OH with N=N to naphthalene-OH] | [structure: quinoline-N=N-naphthalene with OH, Cl, Cl] | black |
| 31. | " | [structure: quinoline-N=N-naphthalene with OH and NH-CO-CH₃] | blue-grey |
| 32. | [structure: HO₃S, OH, NO₂-naphthalene, N=N, HO, HO₃S-naphthalene, NH-CO-CHBr-CH₂Br] | [structure: quinoline-N=N-naphthalene with OH and SO₃H] | black |
| 33. | [structure: HO₃S-naphthalene-OH, N=N, naphthalene-OH] | [structure: quinoline-N=N-pyrazole(OH,CH₃)-benzene(Cl,Cl,SO₃H)] | olive |
| 34. | " | [structure: quinoline-N=N-naphthalene with OH and SO₃H] | grey |

| Nr. | I | II | III |
|---|---|---|---|
| 35. | (naphthol-SO3H)-N=N-(naphthol with OH) | (quinoline)-N=CH-(cyclohexanol OH) | green-blue |
| 36. | HO3S-(phenol OH)-N=N-(pyrazolone OH, CH3, phenyl), NO2 | HO3S-(quinoline)-N=N-(naphthol OH), NH-CO-CH=CH2 | brown |
| 37. | " | (quinoline)-N=N-(naphthol OH, CH3, CH3) | red-brown |
| 38. | HO3S-(phenol OH)-N=N-(pyrazolone OH, CH3, phenyl-Cl), Cl | HO3S-(quinoline)-N=N-(naphthol, HN-CH3) | violet-brown |
| 39. | (phenol OH, Cl)-N=N-(naphthol OH, SO3H, NHCO-CHBr-CH2Br) | HO3S-(quinoline)-N=N-(naphthol OH) | grey |
| 40. | (phenol OH, O2N)-N=N-(naphthol OH, SO3H) | (quinoline)-N=N-(naphthol OH, HO3S, NH-triazine-Cl-NH-C6H4-SO3H) | blue-grey |

| Nr. | I | II | III |
|---|---|---|---|
| 41. | (structure: 2-nitro-6-hydroxyphenyl–N=N–(amino,sulpho-naphthyl)) | (structure: quinolinyl–N=CH–hydroxyphenyl) | green |
| 42. | (structure: hydroxy-nitrophenyl–N=N–(hydroxy, NHCOC=CH₂/Br, disulpho naphthyl)) | (structure: quinolinyl–N=N–(amino, sulpho naphthyl)) | dark-green |
| 43. | (structure: sulpho-quinolinyl–N=N–(HO, OH, Br pyridyl)) | (structure: HO₃S, OH, Cl phenyl–N=N–(HO, OH, Br pyridyl)) | blue |
| 44. | (structure: quinolinyl–N=N–hydroxynaphthyl) | (structure: HO₃S, OH, NO₂ phenyl–N=N–(HO, OH, Br pyridyl)) | green-grey |

EXAMPLE 9

4.53 Parts of the azo dyestuff obtained from diazotised 1-hydroxy-2-amino-4-nitrobenzene-6-sulphonic acid and 1-4'-chlorophenyl-3-methylpyrazol-5-one, as well as 3.79 parts of the azo dyestuff obtained from diazotised 8-aminoquinoline and 1-hydroxynaphthalene-4-sulphonic acid and 2 parts of anhydrous sodium carbonate are dissolved with stirring at 70°C in 200 parts by volume of water. Then 25 parts by volume of a 3.1% aqueous solution of sodium disalicylatochromate-III are added and the reaction solution is stirred under reflux until metal-free azo dyestuff can no longer be identified. The reaction mixture contains mainly the mixed complex of the azo dyestuffs of the formulae

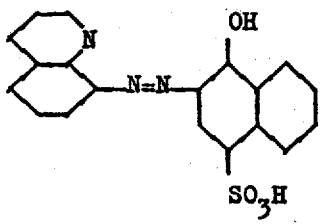

and

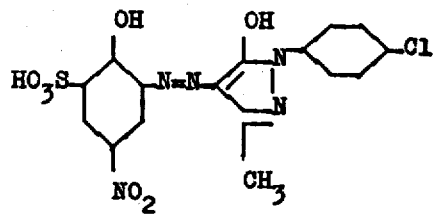

Working up according to Example 3 provides a slightly water-soluble dyestuff which dyes wool and polyamide fibres from a weakly acidic bath full, very fast dark brown tints.

EXAMPLE 10

A solution of the two dyestuffs prepared as described in Example 9 is mixed at 80°C with a solution of 3 parts of crystalline cobalt sulphate and 1.5 parts of tartaric acid in 20 parts by volume of water. The dark brown solution is stirred on for 1 hour at 80° to 85°C and then clarified by filtration. The filtrate is evaporated to dryness under vacuum and the residue ground.

The new dyestuff is a mixture of the symmetrical 1:2-cobalt complex of the two parent dyestuffs and the mixed complex of the azo dyestuffs of the formulae

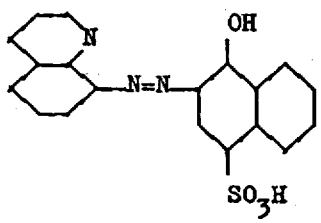

and

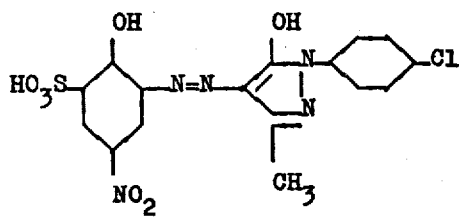

Wool is dyed from an acetic acid bath in the presence of a condensation product of oleylamine with ethylene oxide full, yellowish brown tints having good fastness properties.

EXAMPLE 11

3.88 Parts of the azo dyestuff obtained from diazotised 1-hydroxy-2-amino-5-nitrobenzene and 2-aminonaphthalene-6-sulphonic acid, as well as 4.78 parts of the azo dyestuff obtained from diazotised 8-aminoquinoline and 1-(2',5'-dichloro-4-sulphophenyl)-3-methylpyrazol-5-one and 2 parts of anhydrous sodium carbonate are dissolved at 80°C in 200 parts by volume of water.

The dyestuff mixture obtained by subsequent cobaltisation and working up as described in Example 10 contains, inter alia, the mixed complex of the azo dyestuffs of the formulae

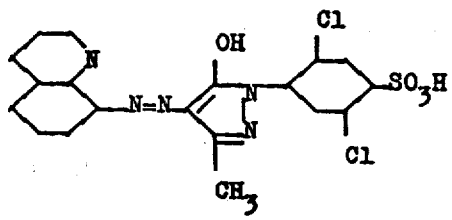

and

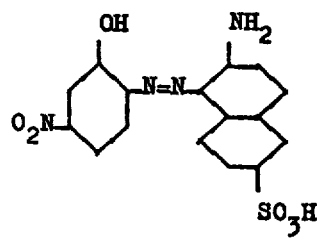

with which wool can be dyed by the process described in Example 10 full, dark-green tints.

EXAMPLE 12

3.89 Parts of the azo dyestuff obtained from diazotised 1-hydroxy-2-amino-5-nitrobenzene and 1-hydroxynaphthalene-4-sulphonic acid in the form of the 1:1-chromium complex, as well as 4.25 parts of the azo dyestuff obtained by alkaline coupling of diazotised 8-aminoquinoline-5-sulphonic acid with 2,3-dihydroxy-5-bromopyridine, and 2 parts of sodium bicarbonate in 100 parts by volume of water are stirred at 90° to 95°C until the two parent dyestuffs can no longer be identified. The resulting uniform mixed complex of the azo dyestuffs of the formulae

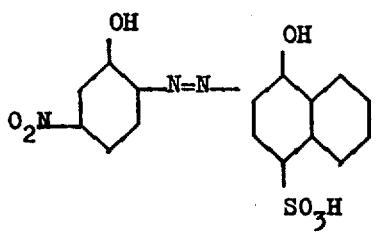

and

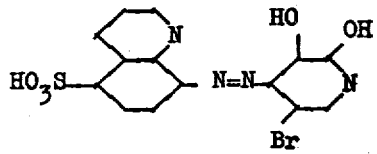

is precipitated from the clear reaction solution by adding sodium chloride, filtered, washed with dilute sodium chloride solution and dried at 70°C under vacuum. The new dyestuff gives a greenish blue aqueous solution and dyes wool, natural silk and polyamide fibres from a weakly acidic bath full, fast greenish blue tints.

EXAMPLE 13

3.88 Parts of the azo dyestuff obtained from diazotised 1-hydroxy-2-amino-5-nitrobenzene and 2-aminonaphthalene-6-sulphonic acid in the form of the 1:1-chromium complex and 3.00 parts of the azo dyestuff obtained by alkaline coupling of diazotised 8-aminoquinoline with 2,3-dihydroxy-5-chloro-pyridine are reacted as described in Example 12 to produce the uniform mixed complex of the azo dyestuffs of the formulae

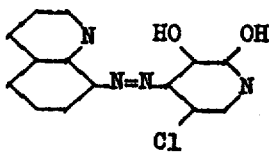

and

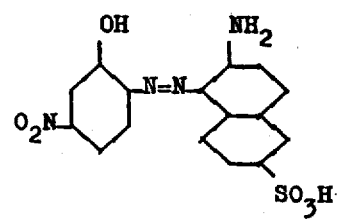

The dyestuff is precipitated from the reaction solution by adding sodium chloride, filtered, washed with dilute sodium chloride solution and dried at 70°C under vacuum. Polyamide fibres can be dyed with the new dyestuff from a neutral to weakly acidic bath full, fast bluish green tints.

EXAMPLE 14

4.62 Parts of the azo dyestuff obtained from diazotised 8-aminoquinoline and 2-aminonaphthalene-6-γ-N,N-dimethylamino-n-propylsulphonamide in the form of the 1:1-chromium complex in 120 parts by volume of dimethylformamide are reacted with 4.72 parts of the dyestuff obtained from diazotised 1-hydroxy-2-amino-5-nitrobenzene and 2-aminonaphthalene-6-γ-N,N-dimethylamino-n-propylsulphonamide at 100°C to 105°C with stirring to produce the uniform greyish mixed complex.

After the reaction solution has cooled to 50°C, 2 parts by volume of dimethyl sulphate are added and the whole is stirred at 50°C until all tertiary amino groups of the mixed complex have been quaternated. The reaction mixture is then diluted with dilute sodium chloride solution and the precipitated mixed complex is filtered, washed with dilute sodium chloride solution and dried at 70°C under vacuum. The new dyestuff forms a grey-brown solution in hot water and dyes polyacrylonitrile fibres from an aqueous bath neutral grey tints.

Instruction for dyeing knitting wool:

100 parts of knitting wool are immersed in a dyebath containing in 3000 parts of water, 5 parts of ammonium sulphate and 1 part of the dyestuff described at the end of Example 1. The bath is heated to the boil within half an hour and the wool is dyed for another hour at the boil, rinsed and dried. A level, green dyeing is obtained.

Instruction for dyeing woollen fabrics:

100 parts of a woollen fabric are immersed at 50° to 60°C in a dyebath consisting of 3000 parts of water, 5 parts of 40% acetic acid, 10 parts of sodium sulphate, 2 parts of the ethylene oxide adduct prepared as described below and 1 part of the dyestuff mentioned in Example 1. The bath is raised to the boil within half an hour, the fabric is dyed at the boil for another hour, rinsed and dried. A level, dark-green dyeing is obtained.

The above-mentioned ethylene oxide adduct is prepared in the following manner:

Manufacturing the ethylene oxide adduct:

100 Parts of commercial oleylamine are mixed with 1 part of finely dispersed sodium, heated to 140°C and ethylene oxide injected at 135° – 140°C. When the ethylene oxide is being absorbed rapidly, the reaction temperature is lowered to 120° – 125°C and the injection of ethylene oxide is continued until 113 parts thereof have been absorbed. The reaction product obtained in this manner gives a practically clear aqueous solution.

We claim:

1. A chromium complex containing one molecule of each of the following formula:

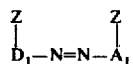

and

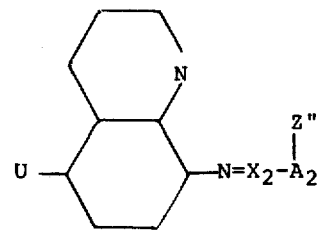

$D_1$ is phenyl or naphthyl, or phenyl or naphthyl substituted by chloro, bromo, lower alkyl, aryl, lower alkoxy, aryloxy, nitro, sulfo, sulfonamido, sulfonamido substituted by lower alkyl, lower hydroxyalkyl, lower alkoxyalkyl, lower cyanoalkyl, aralkyl, $C_5$–$C_9$-cycloalkyl or aryl, lower alkoxyalkylsulfonyl lower hydroxy-, chloro-, cyano-, or alkoxyalkylsulfonyl, arylsulfonyl, arylazo, lower alkanoyl, benzoyl and acylamino, wherein "lower" means "containing 1 to 5 carbon atoms", "aryl" designates naphthyl or phenyl, or phenyl or naphthyl substituted by chloro, bromo, nitro, sulfo, carboxy, lower alkyl, lower alkoxy and acylamino and "acylamino" means —$NH_2$ substituted by lower alkanoyl, lower alkoxycarbonyl, lower alkylsulfonyl, benzoyl, chloro-, nitro- or methylbenzoyl, phenylsulfonyl, chloro-, nitro- or methylphenyl-sulfonyl or chloro, bromo- or sulfatosubstituted lower alkanoyl or alkylsulfonyl, lower alkenoyl or lower alkenoyl substituted by chloro or bromo, chloro- or bromo-substituted triazinyl and pyrimidyl, 2,6-dichloropyrimidine-5-carbonyl, 2,3-dichlorochinoxaline-7-carbonyl-, 1,4-dichlorophthalazine-7-carbonyl;

$A_1$ and $A_2$ are each independently phenyl or phenyl substituted by lower alkyl, acetylamino, propionylamino, ethoxycarbonylamino, methylsulfonylamino, benzoylamino, chloro-, nitro- or methyl-benzoylamino, benzoylamino, phthaloylamino, phenylsulfonylamino, chloro-, nitro- or methylphenylsulfonylamino, chloroacetylamino, α,β-dibromopropionylamino, β-sulfatoethylsulfonylamino, acryloylamino, α-bromoacryloylamino, 2,4-dichlorotriazinylamino, 2-chloro-4-methoxytriazinylamino, 2-chloro-4-isopropoxytriazinylamino, 2,4,5-trichloropyrimidylamino, sulfo, —$NH_2$, hydroxy, lower alkanoyl and arylazo, naphthyl or naphthyl substituted by sulfo, hydroxy, acylamino, sulfonamido, —$NH_2$, phenylamino and sulfo- or —$NH_2$-substituted anilino, or 3-methyl-pyrazolyl bound to the azo group in position 4, carrying the OH-group in position 5 and substituted in position 1 by phenyl or naphthyl or phenyl or naphthyl substituted by chloro, lower alkyl, lower alkoxy, —$NH_2$, nitro, sulfonamido, sulfonamido substituted by lower alkyl, lower hydroxyalkyl, lower alkoxyalkyl, lower cyanoalkyl, aralkyl, $C_5$–$C_9$-cycloalkyl or aryl and lower alkyl-lower hydroxyalkyl-, lower chloroalkyl-, lower alkoxy-alkyl- or lower cyanoalkylsulfonyl, or the residue of acetoacetanilide or acetoacetanilide substituted in the anilide nucleus by lower alkyl, lower alkoxy, sulfo, lower alkyl-, lower hydroxyalkyl-, lower alkoxyalkyl- or lower cyanoalkylsulfonyl, sulfonamido, substituted sulfonamido, chloro or —$NH_2$, wherein "lower", "aryl" and "acylamino" are defined as above; and U is hydrogen, sulfo, chloro, bromo, nitro, acylamino or arylazo, the meanings of the latter terms being the same as defined above.

2. A chromium complex according to claim 1 containing one molecule of each of the formula

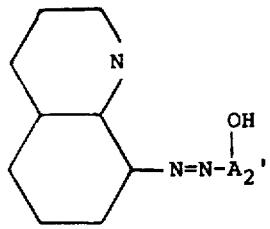

and

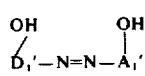

wherein
 $D_1'$ is phenyl or phenyl substituted by chloro, bromo, lower alkyl, aryl, lower alkoxy, aryloxy, nitro, sulfo, sulfonamido, sulfonamido substituted by lower alkyl, lower hydroxy-alkyl, lower alkoxyalkyl, lower cyanoalkyl, aralkyl, $C_5$–$C_9$-cycloalkyl or aryl, lower alkyl sulfonyl, lower hydroxy-, chloro-, cyano- or alkoxyalkylsulfonyl, arylsulfonyl, arylazo, lower alkanoyl, benzoyl and acylamino and
 $A_1'$ and $A_2'$ are each independently phenyl or phenyl substituted by lower alkyl, acylamino, sulfo, —$NH_2$, hydroxy, lower alkanoyl and arylazo, naphthyl or naphthyl substituted by sulfo, hydroxy, acylamino, sulfonamido, —$NH_2$, phenylamino and sulfo- or —$NH_2$-substituted phenylamino or the pyrazole residue bound to the azo group in position 4, carrying the OH-group in position 5 and substituted in position 1 by phenyl or naphthyl unsubstituted or substituted by chloro, lower alkyl, lower alkoxy, —$NH_2$, nitro, sulfonamido, sulfonamido substituted by lower alkyl, lower hydroxyalkyl, lower alkoxyalkyl, lower cyanoalkyl, aralkyl, $C_5$–$C_9$-cycloalkyl or aryl and lower alkylsulfonyl or hydroxy-, chloro-, alkoxy or cyanoalkylsulfonyl, wherein "lower", "aryl" and "acylamino" as defined in claim 1.

3. The complex compound as claimed in claim 1, which contains one molecule of each of the compounds of the formulae

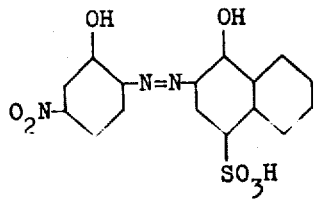

and

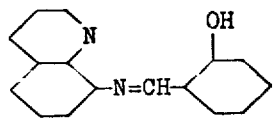

bound in complex union to one chromium atom.

4. The complex compound as claimed in claim 1 which contains one molecule of each of the compounds of the formulae

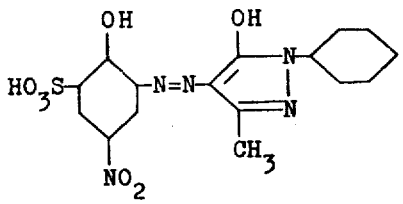

and

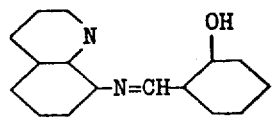

bound in complex union to one chromium atom.

5. The complex compound as claimed in claim 1 which contains one molecule of each of the azo compounds of the formulae

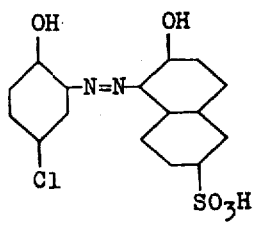

and

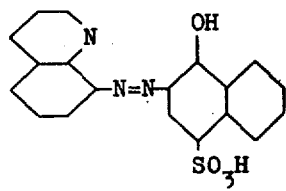

bound in complex union to one chromium atom.

6. The complex compound as claimed in claim 1 which contains one molecule of each of the azo compounds of the formulae

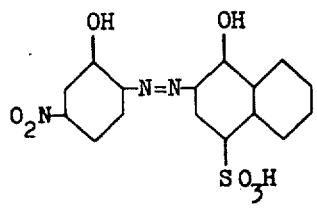

and

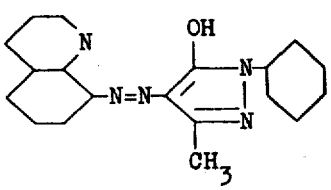

bound in complex union to one chromium atom.

7. The complex compound as claimed in claim 1 which contains one molecule of each of the azo compounds of the formulae

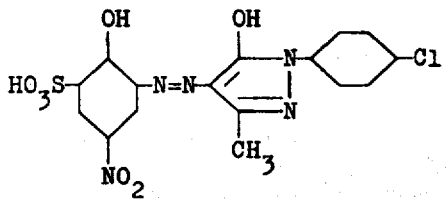

and

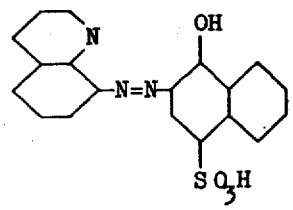

bound in complex unit to one chromium atom.

8. The complex compound as claimed in claim 1 which contains one molecule of each of the azo compounds of the formulae

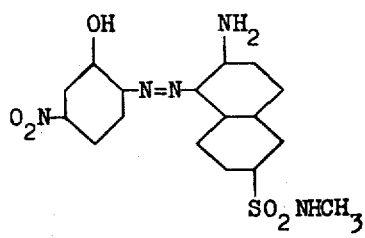

and

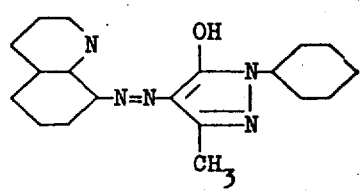

bound in complex union to one chromium atom.

9. The complex compound as claimed in claim 1 which contains one molecule of each of the compounds of the formulae

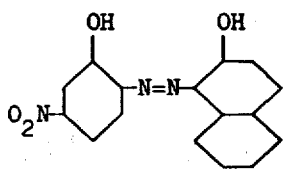

and

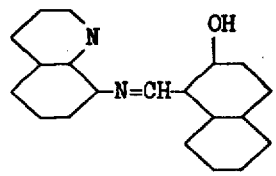

bound in complex union to one chromium atom.

10. The complex compound as claimed in claim 1 which contains one molecule of each of the azo compounds of the formulae

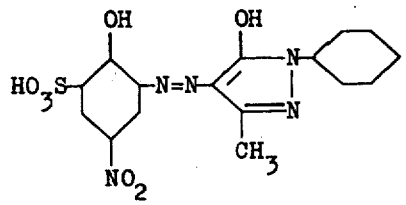

and

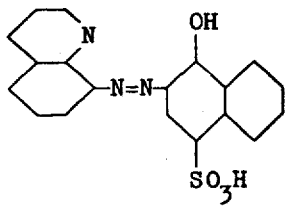

bound in complex union to one chromium atom.

11. The complex compound as claimed in claim 1 which contains one molecule of each of the azo compounds of the formulae

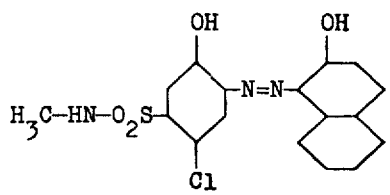

and

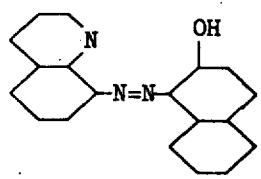

bound in complex union to one chromium atom.

12. The complex compound as claimed in claim 1 which contains one molecule of each of the azo compounds of the formulae

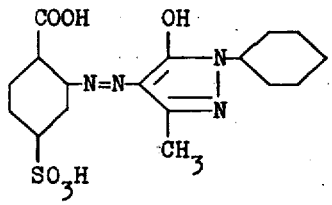

and

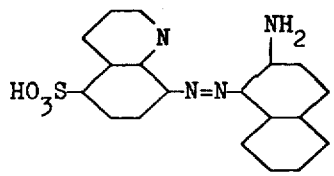

bound in complex union to one chromium atom.

13. The complex compound as claimed in claim 1 which contains one molecule of each of the azo compounds of the formulae

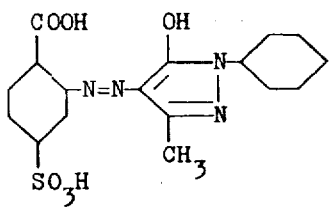

and

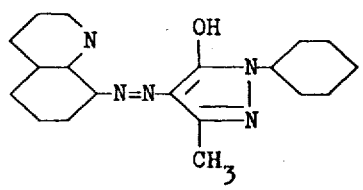

bound in complex union to one chromium atom.

14. The complex compound as claimed in claim 1 which contains one molecule of each of the azo compounds of the formulae

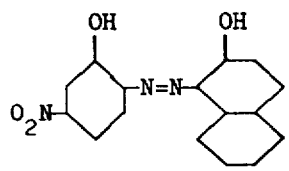

and

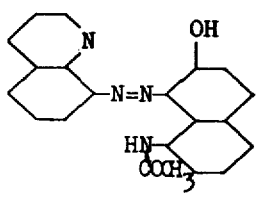

bound in complex union to one chromium atom.

15. The complex compound as claimed in claim 1 which contains one molecule of each of the azo compounds of the formulae

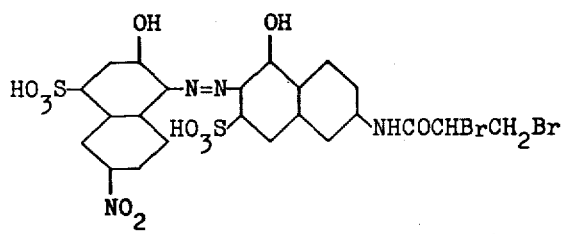

and

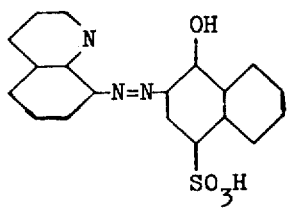

bound in complex union to one chromium atom.

16. The complex compound as claimed in claim 1 which contains one molecule of each of the compounds of the formulae

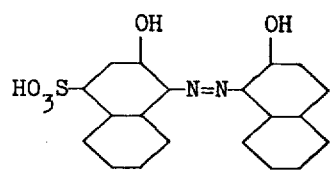

and

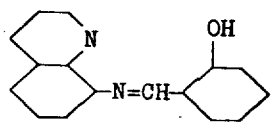

bound in complex union to one chromium atom.

17. The complex compound as claimed in claim 1 which contains one molecule of each of the compounds of the formulae

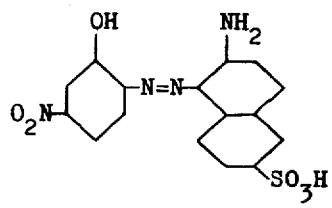

and

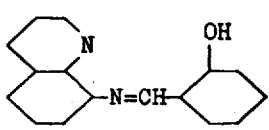

bound in complex union to one chromium atom.

* * * * *

UNITED STATES PATENT AND TRADEMARK OFFICE
CERTIFICATE OF CORRECTION

PATENT NO. : 3,933,785
DATED : January 20, 1976
INVENTOR(S) : Gerhard Back et al.

It is certified that error appears in the above-identified patent and that said Letters Patent are hereby corrected as shown below:

Claim 1, line 18, delete "alkoxyalkylsulfonyl" and insert

-- alkylsulfonyl --;

line 41, delete the second "benzoylamino".

Signed and Sealed this twentieth Day of April 1976

[SEAL]

Attest:

RUTH C. MASON
*Attesting Officer*

C. MARSHALL DANN
*Commissioner of Patents and Trademarks*